United States Patent

[11] 3,619,422

[72] Inventors Roman Rummel, deceased
  late of Bruhl;
  Elsa Rummel, Heir, Bruhl; Irmgard Rummel, Heir, Backnang; Heinz Rummel, Heir, Bruhl; Inge Rummel, Heir, Bruhl, all of Germany
[21] Appl. No. 758,185
[22] Filed Aug. 30, 1968
[45] Patented Nov. 9, 1971
[73] Assignee Von Roll AG
  Gerlafingen, Switzerland
[32] Priority Sept. 4, 1967
[33] Switzerland
[31] 12321/67

[54] PROCESS OF DRYING SEWAGE SLUDGE
  4 Claims, 12 Drawing Figs.
[52] U.S. Cl. .................................................. 210/10,
  34/9, 110/8, 165/107, 210/67, 210/68, 210/152
[51] Int. Cl. .................................................. C02c 3/00
[50] Field of Search............................................ 260/683;
  165/104, 106, 107; 110/8, 15; 34/9, 10, 57; 210/2, 10, 12, 68, 67, 152

[56] References Cited
UNITED STATES PATENTS

| | | | |
|---|---|---|---|
| 1,614,387 | 1/1927 | Pereda .......................... | 165/107 |
| 2,723,954 | 11/1955 | Young............................ | 34/9 X |
| 3,272,335 | 9/1966 | Nettel............................ | 210/68 |
| 3,290,790 | 12/1966 | Kunii et al. .................... | 34/9 |
| 3,306,236 | 2/1967 | Campbell ...................... | 110/8 |
| 3,319,587 | 5/1967 | Albertson et al. ............. | 110/8 |

Primary Examiner—Michael Rogers
Attorneys—Jacobi and Davison and Werner W. Kleeman ABSTRACT: A novel process is disclosed for the transfer of heat and/or matter between two or more gaseous or liquid agents, the process utilizing a carrier substance continuously circulated in closed cycle successively through at least two working spaces wherein heat and/or mater is respectively taken up and yielded. The carrier substance is present in a thin layer and the agents are caused to flow across the layer of carrier substance at both working spaces. Novel mechanical assemblies for the performance of said process are also disclosed herein.

PROCESS OF DRYING SEWAGE SLUDGE

BACKGROUND OF THE INVENTION

The present invention relates to both a process and to a mechanical assembly for the transfer of heat and/or matter between two gaseous or liquid agents, by means of a minute and loose, solid carrier substance in continuous circulation through at least two working spaces in succession, the carrier substance taking up and respectively yielding heat and/or matter from and to one of the aforesaid agents.

Heat exchangers using a minute and loose carrier substance in a closed circuit configuration are already know, the closed circuit usually comprising vertical chambers or pits, wherein the carrier substance is heated in counterflow by a first gaseous or liquid agent, and thereupon transfers the heat in a second similar device to another agent also in counterflow with the carrier substance. The primary advantage of such heat exchangers resides in the wide choice available for the carrier substance, whereby a substance can be chosen to best meet the respective requirements. Thus, finer or coarser carrier substances may be adopted, presenting a larger or smaller active surface in contact with the giving or receiving agent. Furthermore, carrier substances of mineral or organic nature may be used, to best withstand the physical and/or chemical phenomena and reactions liable to occur, such as corrosion, erosion, temperature shocks, and the like. Finally, the carrier substance may act as catalyst for the chemical reactions expected or be a support for the catalyst proper.

In comparison, heat exchangers of the recuperative and regenerative type are far less versatile.

On the other hand, heat exchangers having recirculated carrier substances are obviously more costly in operation, due to the energy consumed, but this disadvantage is by far outweighed by the functional advantages discussed above. Furthermore, regenerative heat exchangers are very bulky and the necessary switchover mechanisms are very costly. Because of the large active surface of the carrier substance, heat exchangers of the type described herein have a high specific capacity in relation to their volume; far above that of recuperators and regenerators.

In spite of their multiple advantages, heat exchangers with recirculated carrier substances are not widely used. The reason apparently lies in the fact that for high efficiency the carrier substance must be present in comparatively thick layers, to ensure a homogeneous repartition of the agent's flow through it. In the case of pits with circular cross section, actual practice has shown that the height of the active layer must be at least equal to its diameter. The great thickness of the layer causes a large drop of pressure-head to the stream of the agent, which in most cases is prohibitive. Thus the use of heat exchangers with recirculated carrier substances has so far been limited to such cases where the drop of pressure-head in the layer could be accepted.

From the functional point of view, the transfer of matter to and from a carrier substance, by known processes, such as absorption, adsorption, chemical binding and the like, is quite similar to the exchange of heat. Accordingly, the following considerations and the embodiments to be described below, although referring to the exchange of heat, are equally applicable for the transfer of matter.

As is well known, in the case of a fluid flowing through a layer of minute and loose matter, the drop of pressure-head in the layer is a linear function of the length of path, and a square function of the velocity. When considering a layer of constant volume, it is therefore obvious that by increasing the extension of the layer and simultaneously decreasing the length of path, i.e. the thickness of the layer, any desired reduction of the drop of pressure-head is at least theoretically possible. Limitations, however, arise, since in practice it is not possible to achieve a homogeneous flow of a gaseous or liquid agent through a rather thin layer of great extension. This also is true for both processes of transferring heat and/or matter, and, of course, for their combination as well.

The high drop of pressure-head in the layer of carrier substance is, therefore, the primary and decisive hindrance to a wider utilization of the method based on recirculated carrier substances for the transfer of heat and/or matter.

SUMMARY OF THE INVENTION

It is a primary object of the invention to overcome and remedy the above described inconveniences of prior art heat and/or matter transfer methods using recirculated carrier substances. It is a further, more specific object of the invention to reduce, in a simple way, the previously prohibitive high drop of pressure-head in the layer of carrier substance, while, at the same time, maintaining the advantages offered.

To this effect, the present invention primarily is directed to a novel process of transfer of heat and/or matter, using a solid carrier substance of minute and loose constitution, which is circulated in closed circuit through two working spaces in succession, to take up heat and/or matter in the first working space and yield heat and/or matter in the second one, from and respectively to a stream of a gaseous or liquid agent, or vice versa.

In accordance with the invention, the novel process is characterized by the features that, in both working spaces, the carrier substance is present in a thin layer and that, under the effect of gravity, the carrier substance is moved downwards from one working space into the other one at an uniform rate under control, and that the streams of agents in both working spaces are caused to flow across the moving layer of carrier substance.

Another object of the invention is the provision of a mechanical apparatus of novel construction for the performance of the process outlined above, the apparatus or assembly being characterized by the features that the working spaces are shaped as narrow and slender pits, with their sidewalls permeable to the stream of the agent involved with inlet and outlet openings for said agent, and that at least one adjustable device is provided for controlling the rate of recirculation of the carrier substance through the working spaces.

In a preferred embodiment of the invention, the two working spaces may each be divided in at least two sections, connected by conduits outside the permeable sidewalls, and arranged in succession relative to the agent's flow. With this construction, combinations of cross- and counterflow are possible, by means of which the temperature of the agents, when leaving the last section of the respective working space, is practically the same as in pure counterflow. In the case of transfer of matter, the above considerations still apply, as the references to temperature would be replaced by considerations of concentration.

In another preferred embodiment of the invention, the permeable sidewalls of the working spaces may consist either of a porous material, or of a trellis tube, or of oblique plates arranged as in Venetian blinds.

In still another preferred embodiment of the invention, the two working spaces are coaxially arranged and connected by an equally coaxial channel of adequate length. At working pressures not too different in the two working spaces, the connecting channel which is filled with the carrier substance, presents a sufficiently high resistance to the flow of the agents so that a practical separation of the working spaces is achieved, thereby avoiding the flow of the agents from one working space into the other, or vice versa.

In yet another preferred embodiment of the invention, the working spaces are connected by channels, evenly distributed over their cross section, to serve as passage for the carrier substance from one working space to another, the channels being of sufficient length and of sufficiently narrow cross section to ensure practical separation of the working spaces with respect to the agents therein, as discussed above.

In a preferred modification of the last two embodiments, partial openings are provided in the connecting channel as an inlet for an occluding agent such as an inert gas or steam, which may flow into one or both working spaces without influencing the process of transfer of heat and/or matter.

In still another preferred embodiment of the invention, a plurality of working spaces may be provided for several processes of different nature.

In another preferred embodiment of the invention, one of the two working spaces may have impermeable walls, with openings at the upper and lower ends, as inlet and outlet for the respective agent, which thereby may be directed in parallel or counterflow with the carrier substance. The combination of this with the the agent's normal crossflow may be useful in some cases.

In a further preferred embodiment of the invention, pits of annular cross section may be used as working spaces, which leads to an assembly of overall cylindrical form, which may be advantageous due to its compactness and solidity.

When used for preheating the combustion air in a steam boiler plant, one of the working spaces may be incorporated in a flue duct to allow the hot combustion gases to heat the carrier substance.

In a preferred embodiment of the invention used for drying sewage sludge in combination with a refuse incinerator, metallic balls may be used as the carrier substance, to be heated in the upper working space by combustion gases and thereupon to be sprayed with liquid sewage sludge in the lower working space. The water vapor emanating from the lower working space is then caused to comingle with the stream of flue-gas effluent from the incinerator, while the dried sewage sludge is discharged together with the carrier substance and separated from it by sieving, before the carrier substance is recirculated into the upper working space. The separated dry sewage sludge may subsequently be fed into the furnace of the incinerator. In order to avoid possible adherence of the dry sewage sludge to the metallic carrier substance, the second working space may preferably be a rotating kiln, wherein the still liquid sewage sludge is sprayed.

In another preferred embodiment of the invention, hydrocarbons may be cracked, by means of a catalyst contained in the carrier substance. In a first working space, hot combustion gases drawn from a conventional furnace are used for heating up the carrier substance, while in a second working space, a stream of gaseous or vaporized hydrocarbons is brought into contact with the hot carrier substance to be heated up and cracked, the cracking products being then cooled and submitted to adequate treatment. The carrier substance is then passed into a third working space, therein to heat the combustion air used in the furnace, and is eventually recirculated into the first working space to complete the circuit.

In another preferred embodiment of the invention used for the thermal cracking of hydrocarbons, particularly of heavy oils, the carrier substance is heated up in a first working space by burning therein cracking residues, as explained below. The hot carrier substance is then passed into a second working space, wherein the liquid hydrocarbons to be cracked are atomized by means of steam, the resulting gaseous or vaporized cracking products being drawn from the second working space for subsequent cooling and further treatment, while the solid cracking residues are discharged together with the carrier substance for recirculation into the first working space.

BRIEF DESCRIPTION OF THE DRAWINGS

The subject inventive process and apparatus or assembly will be better understood and other objects, advantages and features thereof will become apparent when attention is directed to the following detailed description of preferred embodiments, such description making reference to the appended drawings, wherein.

DETAILED DESCRIPTION OF PREFERRED EMBODIMENTS

Figure 1:
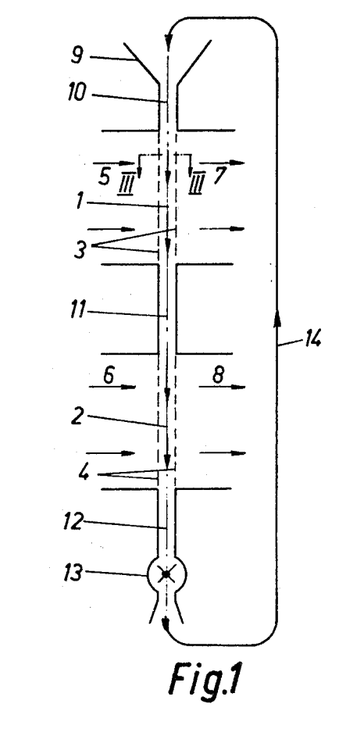
FIG. 1 is a vertical section of an assembly comprising two working spaces.

In FIG. 1, the simplest embodiment of the invention is shown, with an upper working space 1 and a lower working space 2, both shaped as narrow pits in vertical arrangement. The sidewalls 3 and 4 of both working spaces are permeable to the streams of receiving and yielding agents, which flow through the working spaces 1 and 2, entering and leaving in the direction of the arrows, through the ducts 5 and 6 and, respectively, 7 and 8. In both working spaces 1 and 2, the carrier substance is present as a thin layer from a hopper 9 and through a channel 10, and moves downwardly through the two working spaces in succession, the channel 11 serving as connection. The channel 12 leads into a cellular rotating block 13, serving for the control of the rate of recirculation, while a conveyor 14 (not represented) ensures the recirculation as indicated by the arrow, the carrier substance being brought back into the hopper 9, thereby completing its closed circuit.

From the arrows in FIG. 1, it is apparent that both agents are flowing through the thin layer of carrier substance, crosswise to the vertical moving direction of the latter.

When using the assembly described above for preheating air, hot combustion gases are led through the duct 5 into the working space 1, therein to heat up the carrier substance by yielding at least part of their sensible heat, and then to leave through duct 7. The hot carrier substance then moves through the channel 11 into the lower working space 2, wherein fresh air is fed through duct 6. By flowing through the hot carrier substance, this air is preheated and leaves as such through duct 8. The rate of movement of the carrier substance through the working spaces 1 and 2, which is that of its recirculation, is governed by the speed of rotation of the cellular lock 13. A possible passage of air from the working space 2 into the working space 1 is prevented by the length of the connecting channel 11, which is filled with the carrier substance. Even at high air pressures in the working space 2, only very small amounts of air may surmount the resistance of the column of carrier substance in the channel 11. The same is also true for the channels 10 and 12.

In FIG. 1, the channels 10, 11 and 12 are shaped as vertical pits, coaxial with the working spaces 1 and 2. At higher working pressures, for instance in the working space 2, the cross section of the channels 10, 11 and 12 may be reduced by means of internal partitions, equally spaced, thereby opposing a higher resistance to the possible overflow of an agent from one working space into another.

Figure 2:
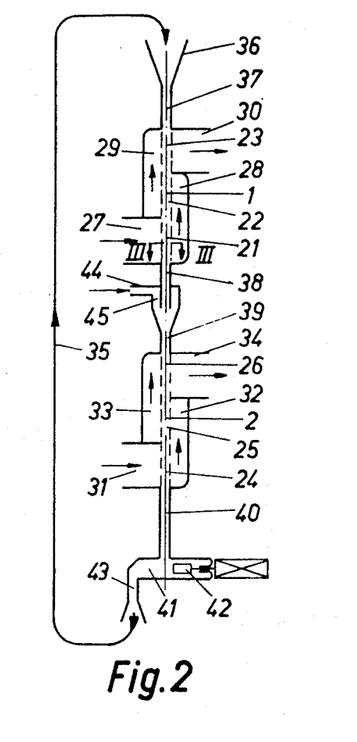
FIG. 2 is a vertical section of an assembly similar to that represented in FIG. 1, but with each working space divided in three sections.

In FIG. 2, another embodiment is shown, also having two working spaces 1 and 2 in vertical arrangement, the working spaces, however, being divided each into three sections 21, 22, 23 and respectively, 24, 25, 26. The agent entering through the duct 27 into the working space 1, as indicated by the arrow, flows across the section 21 and is then led through the duct 28 across the section 22 and through the duct 29 across the section 23, to leave eventually through the duct 30.

The other agent follows an analogous path through the three ducts 31, 32 and 33, to cross in three steps the lower working space 2 and leave eventually through the duct 34.

The carrier substance is recirculated by means of a conveyor 35, into the working space 1 through a hopper 36 and a channel 37 and moves successively through the upper working space 1, then channels 38 and 39, the lower working space 2 and the channel 40 to a discharging device. This device essentially comprises a horizontal channel 41, wherein a plunger 42 is moved to-and-fro by a hydraulic drive, thereby propulsing the carrier substance through the channel 43 into the recirculating conveyor 35 (not represented). To prevent the overflow of any agent from one working space into the other, an occluding agent is led through the duct 44 into a chamber 45, between the channels 38 and 39.

The permeable sidewalls of the working spaces in FIGS. 1 and 2, symbolized by dotted lines, may be of various structures and configurations to best ensure the free passage of the agents and the free movement of the carrier substance.

Figure 3:
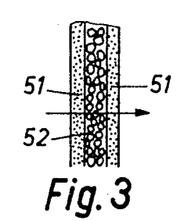
FIG. 3 is an enlarged section of FIGS. 1 and 2, showing the porous walls of the working spaces.

FIG. 3 depicts an enlarged section of a pitlike working space, with two sidewalls 51 of porous structure, permeable to clean gases, and between the sidewalls a thin layer 52 of a coarse-grained carrier substance, for instance ceramic pebbles or metallic balls, easily sliding downwards and offering little resistance to the agent's through-flow.

Figure 4:
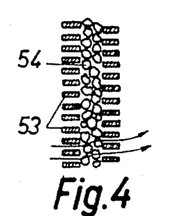
FIG. 4 is an enlarged section of FIGS. 1 and 2, with the walls of the working spaces made of trellis tubes.

FIG. 4 depicts a vertical section of a pitlike working space with sidewalls consisting of metallic trellis, convenient for a coarse carrier substance 54. According to the operating temperatures and to possible chemical influences, suitable materials are used, for both the trellis 53 and the carrier substance 54.

Figure 5:
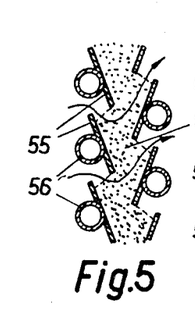
FIG. 5 is an enlarged vertical section of a working space with walls consisting of oblique steel plates arranged as in Venetian blinds.

In FIG. 5, a vertical section through a pitlike working space is partially represented. Here, the working space is limited by sidewalls consisting of oblique steel plates 55, arranged as in Venetian blinds. For greater rigidity and for cooling, tubes 56 are welded to the plates 55. In the two opposed sidewalls the plates 55 are displaced with regard to each other, thereby ensuring a homogeneous layer 57 of carrier substance between them. The tubes 56 and the plates 55 may be incorporated in the heating surface of a steam boiler, for instance, as a vaporizer or as a superheater. In this embodiment with the sidewalls as described, both fine and coarse carrier substances may be used.

Figure 6:
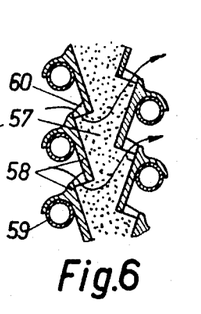
FIG. 6 is an enlarged vertical section of a working space with walls consisting of ceramic plates, arranged like roof tiles.

Similarly to FIG. 5, FIG. 6 shows an enlarged vertical section of a working space with sidewalls consisting of ceramic plates 58, supported by tubes 59, as is the case with roof tiles. Lateral noses 60 protruding at the lower ends of the plates 58 ensure equal spacing between consecutive plates. Here again, the tubes 59 may be used as a heating surface in a steam boiler. The embodiment with ceramic plates 58 has been found particularly suitable and is recommended for operation at higher temperatures.

Figure 7:
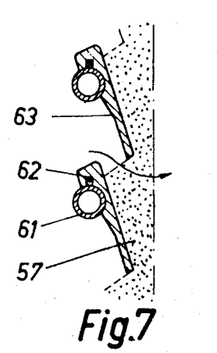
FIG. 7 represents an alternative to FIG. 6 in a vertical half-section.

In FIG. 7, an embodiment similar to that of FIG. 6 is disclosed, with the tubes 61 having longitudinal fins 62, fitting into corresponding grooves of the plates 63, for higher rigidity of the assembly. At very high operating temperatures, the sidewalls may consist entirely of ceramic material, especially when heat transmission through the supporting tubes is not possible or not desirable.

Figure 8:
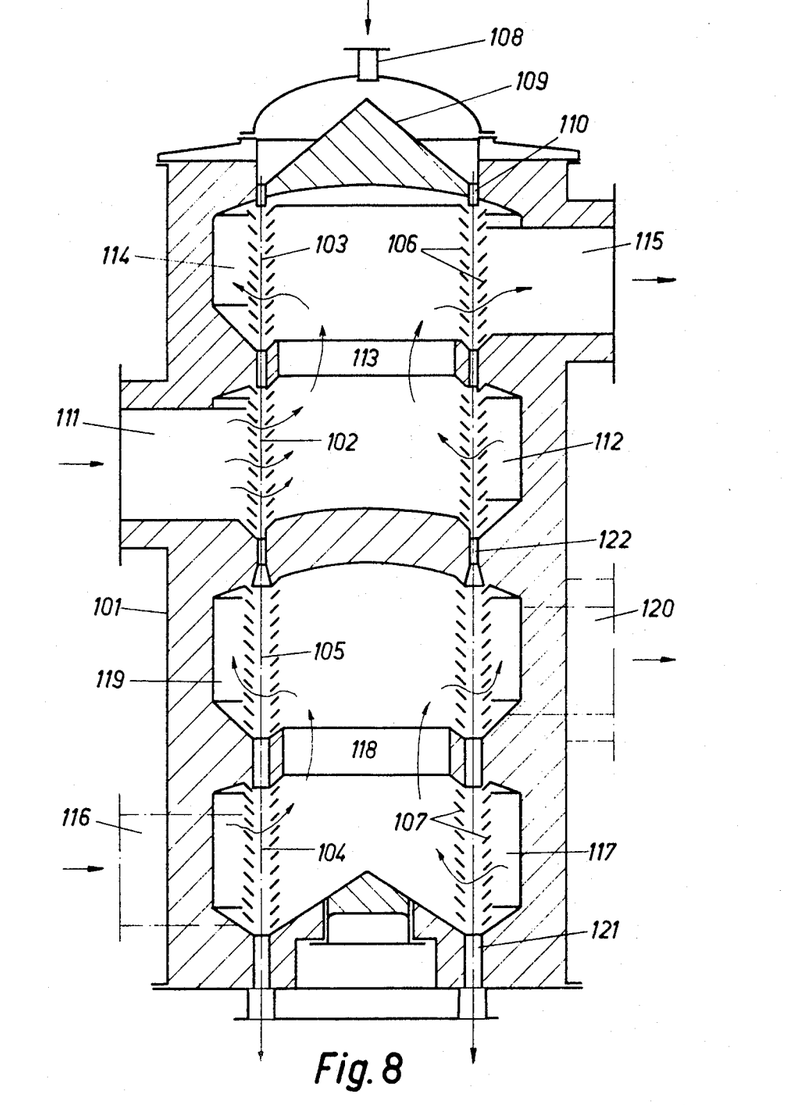
FIG. 8 is a vertical section of an embodiment with annular cross section.

FIG. 8 depicts an embodiment for heating gases such as air for drying or for combustion purposes, the embodiment being a self-supporting unit with working spaces of annular cross section. In a gastight cylindrical casing 101, preferably made of steel plate and lined with refractory brickwork, two working spaces are located one above the other, each comprising two section 102–103 and, respectively, 104–105. These four sections are of annular cross section, with sidewalls 106 and 107 of the kind represented in FIGS. 5, 6 and 7, the carrier substance sliding downwards from section to section. The carrier substance preferably consists of a refractory material, such as corundum, silicon-carbide and the like, with a preferred granulation of 4–8 mm., and is fed through the connection 108. A conical device 109 ensures even repartition of the carrier substance into the annular inlet opening 110.

Hot combustion gases, coming through the duct 111, enter into the annular space 112 and flow across the layer of carrier substance in the section 102. Thereupon, the gases flow upwardly into the central chamber 113, and then across the layer of carrier substance in the section 103, to enter into the annular chamber 114 and be eventually expelled through the outlet opening 115, after having transmitted their sensible heat to the carrier substance in the sections 102 and 103.

The air to be heated is led through a duct 116 into an annular chamber 117 and flows across the layer of carrier substance in the lower section 104. The partially heated air thereupon flows upwardly into the central chamber 118, to cross again the layer of carrier substance in the upper section 105 and then to enter into an annular space 119, from where the hot air is expelled through the outlet opening 120.

The carrier substance moves downwardly, taking up heat in the sections 103 and 102 and then yielding it in the sections 105 and 104, and is eventually discharged through the channels 121 evenly located around the annular periphery. For the passage of the carrier substance from the upper into the lower working space, several evenly distributed channels 122 are provided In a similar way, connecting channels are provided between the sections 102 and 103 of the upper working space and 104 and 105 of the lower working space.

As is apparent in FIG. 8, the layers of carrier substance in the two working spaces may be of different thickness, according to the respective requirements. In the upper sections 102 and 103, i.e. between the sidewalls 106, a thickness of some 50 mm. is recommended, against 100 mm. in the sections 104 and 105, between the sidewalls 107.

Moreover, the possibility exists for different layer thicknesses to be adopted in the sections 102, 103 and 104, 105 respectively.

Figure 9:
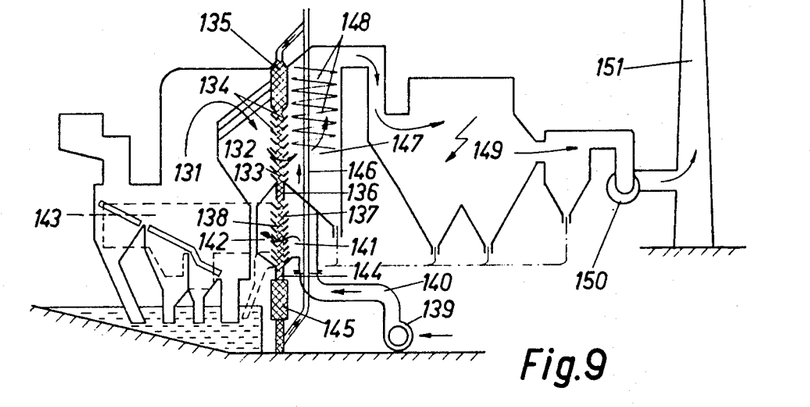
FIG. 9 is a vertical longitudinal section of a refuse incinerating plant with steam boiler, incorporating an embodiment of the invention for preheating the combustion air.

FIG. 9 is a schematic representation of a refuse incinerating plant with a steam boiler for the recovery of heat, where the combustion air is preheated by means of an assembly according to the invention, serving as a heat exchanger, the assembly being incorporated in the steam boiler. Combustion gases effluent from the combustion chamber 131 pass into a first flueduct 132, the right-hand sidewall of which constitutes the working space 133 of the heat exchanger. The two permeable sidewalls 134, defining the working space 133, are of the kind represented in FIGS. 3, 4 or 5 and described above. Through the tubes carrying the plates steam would be flowing for superheating. Above the working space 133, a bunker 135 is provided for the carrier substance. A narrow channel connects the first working space 133 to a second one 137, placed coaxially under the first, with sidewalls 138 similar to 134, permeable to the stream of air to be preheated. A fan 139 drives the air through a duct 140 into a chamber 141, from where it flows across the carrier substance in the working space 137 and then into a chamber 142, to be ducted through 143 below the grates, as under-blast for the burning of refuse. The carrier substance passes from the lower working space through a channel 144 into an intermediate bunker 145, from where it is recirculated by an elevator 146 into the bunker 135.

When flowing across the carrier substance in the upper working space 133, the combustion gases yield a part of their sensible heat to the carrier substance, thereupon pass into a second flue-duct 147, where their residual sensible heat is transmitted to the heating surfaces 148 of the steam boiler. Eventually, the combustion gases pass through the dedusting equipment 149 and the fan 150 to be expelled through the stack 151.

In this embodiment, molten and granulated slag resulting from the incinerating process, in sizes of 3-6 mm. may be used as the carrier substance. At practically no cost, this material is resistant to high temperatures and to chemical action by the combustion gases as well as to superheating, which may occur during a standstill of the circulation, due to some disturbance.

A further important advantage lies in the fact that, in the case of dust-loaded combustion gases, the performance of the carrier substance is not hindered, and the dust retained in the carrier substance may easily be separated by sieving.

Mineral carrier substances, such as sand or metallic and ceramic substances, may of course also be used.

A further important advantage is that, because of the large cross section for the flow of the combustion gases in the upper working space, the thickness of the layer therein may be kept at some 30-40 mm., with a drop of pressure-head of only a few mm. of water column for the stream of combustion gases.

The arrangement described above may also be used when aggressive or poisonous substances have to be removed from combustion or other gases. In such cases, carrier substances are used which are able to bind chemically such noxious substances as nitrous gas or combinations containing chlorine, fluorine or phosphorous.

For the drying of sewage sludge, metallic balls such as steel balls of about 25 mm. in diameter are used as the carrier substance. In this case also, the working space for the heating-up of the steel balls may be incorporated in a steam boiler as already described with respect to FIG. 9.

Figure 10:
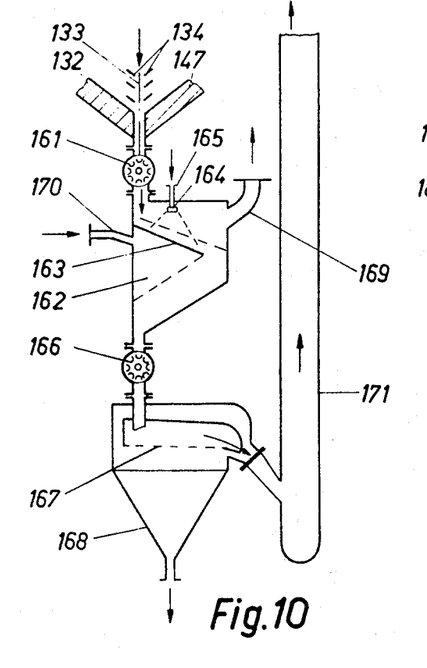
FIG. 10 is a partial vertical section of an embodiment of the invention, used for drying sludge, with a stationary drying space.

FIG. 10 depicts a schematic representation of a drying plant for sewage sludge. The first working space 133 for the heating-up of the steel balls used as the carrier substance is located between the flue-ducts 132 and 147 of the boiler, and are defined by the permeable sidewalls 134. The hot carrier substance moves from the working space 133 and through the cellular lock 161 into the second working space 162. Here, the carrier substance slowly slides over an inclined chute 163, while the liquid sludge is being sprayed over it by means of the nozzles 164 fed through the pipes 165. In contact with the hot carrier substance, the sewage sludge is dried, leaving the working space 162 through the cellular lock 166 together with the carrier substance from which it is separated by means of a vibrating sieve 167. The dry sludge is collected in a receptacle 168 from which it is pneumatically conveyed into the furnace.

The water vapor resulting from the drying process is drawn from the working space 162 through a duct 169 and caused to comingle with hot combustion gases for deodorization. A stream of exhaust gases from the boiler is led into the working space 162 through duct 170 for continuous scavenging of the working space.

From the vibrating sieve 167, the carrier substance is directed into an elevator 171, to be brought back into the working space 133 and thus complete the cycle.

With some sewage sludges, solid crusts may adhere to the steel balls during drying which, however, peel off as small shells dispersed in the carrier substance and are gradually crumbled and ground into fine dust and eventually separated in the vibrating sieve 167 during the following cycle, all without hindering the normal operation.

When such shells are very hard and subsist as such in normal operation, it is recommended that another embodiment of the invention be used as will be described below with reference to FIG. 11.

Figure 11:
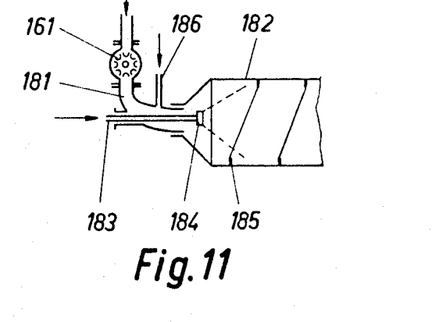
FIG. 11 is a similar embodiment for drying sewage sludge, but with a rotating drying space.

In FIG. 11, the hot carrier substance issuing from the cellular lock 161 is led through the channel 181 into a revolving cylinder 182, wherein the liquid sludge is sprayed by a nozzle 184, fed through the pipe 183. By means of helicoidal ledges 185 internally welded in the cylinder, the carrier substance is caused to travel along its axis. During this travel and because of the tumbling and reciprocal friction of the steel balls, the adhering crusts are detached and ground into fine dust, which is thereupon separated in the usual way. Scavenging gas may be blown into the cylinder through duct 186, to accelerate the effluence of the water vapor resulting from drying.

The two embodiments according to FIGS. 10 and 11 make it apparent that, in some cases and for better performance, it may be desirable to shape and build the two working spaces differently. Furthermore, it is possible to carry out other physical or chemical processes in one of the working spaces, coupled to the process of heat exchange proper, as is the case in the embodiment described in FIG. 11, where the process of drying is coupled with that of grinding the shells of dried sludge.

Figure 12:
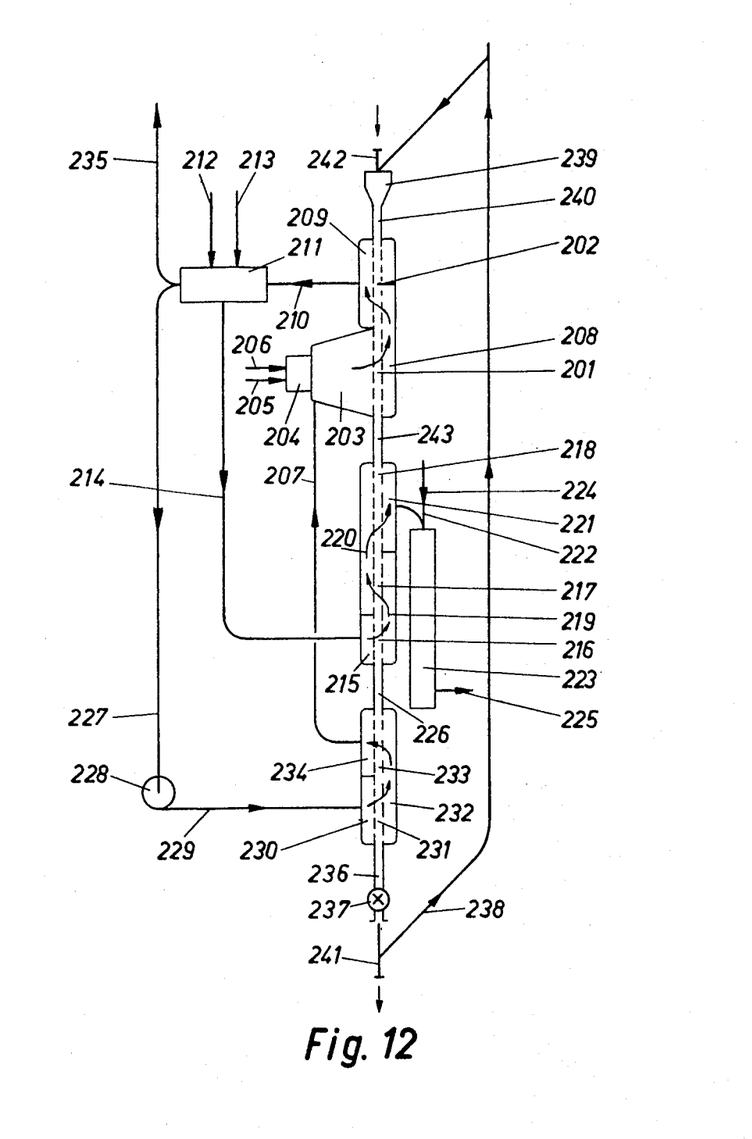
FIG. 12 is a longitudinal section of an assembly used for cracking light gasoline.

In FIG. 12, a plant for cracking light gasoline is schematically depicted with three working spaces in vertical arrangement. In the first, upper working space, the carrier substance is heated in two sections 201 and 202, by hot combustion gases issuing from a combustion chamber 203. Fuel oil is burned therein in a burner 204, the arrows 205 and 206 symbolizing the feed of fuel oil and of combustion air. The temperature of the combustion gases in the chamber 203 is kept under control by the addition of comparatively cool exhaust gas from the boiler, which is recirculated over duct 207. The heating gas is directed through the ducts 208 and 209 to flow across the sections 201 and 202 in succession and then into the heating chamber 211, receiving light gasoline and steam through the pipes 212 and 213, respectively. Here, the gasoline is vaporized and mixed with steam, the mixture flowing through 214 to and across the second, intermediate working space, the flow path leading through the ducts 215, 219, 220, and 221 across the sections 216, 217, and 218 in succession, during which the gasoline vapors are cracked into hydrocarbons of lower molecular weight. Depending on the heating temperature and the catalyst used, the resulting gaseous product may contain more or less saturated and unsaturated hydrocarbons.

When the unsaturated hydrocarbons, such as olefins are preponderant, the hot cracked gas is led through duct 222 into a cooler 223, therein to be cooled by injection of atomized water as symbolized by the arrow 224, to prevent possible secondary reactions between the components of the gas.

With saturated hydrocarbons or with synthetic gas essentially containing carbon monoxide and hydrogen, a supplementary heat exchanger (not represented in FIG. 12) is provided between duct 221 and the cooler 223, for utilization of the gas's sensible heat.

The cracked gas leaves the cooler 223 through a duct 225 for further treatment.

Because of the fact that, at its entry into the second intermediate working space, the mixture of gasoline vapor and steam is already preheated, the carrier substance will still be at a comparatively high temperature when leaving this working space. Accordingly, the carrier substance is led through the channel 226 into a third, inferior working space, therein to be cooled. Part of the exhaust gases effluent from the heating chamber 211 is therefore led through the duct 227, the fan 220 and the duct 230 into said inferior working space, divided in two sections 231 and 233, and across which the stream of gas is flowing, the path of the gas stream leading over 232, 234 and 207 back to the combustion chamber 203. The other part of the exhaust gas is expelled through the stack 235. When particularly high temperature is required in the combustion chamber 203, the third working space is used as an air preheater.

The carrier substance is discharged from the third working space through the channel 236, at a rate kept under control by means of a cellular lock 237. Through elevator 238 the carrier substance is then brought into a bunker 239, to reenter the cycle through the channel 240. Part of the carrier substance in circulation may be withdrawn for regeneration through the channel 241, placed at the lowest level, and is replaced by an equal quantity of fresh or regenerated carrier substance through the feeding channel 242.

The channels 240, 243, 246, 226 and 236 are of sufficient length to prevent the undesired leakage of the agents through them. At higher differences of pressure between the working spaces, an occluding agent may be used, as already mentioned. With special provisions, the plant may be operated at pressures above and below the atmospheric pressure.

The plant described above may be adapted for cracking gaseous hydrocarbons, such as natural, casing-head or refinery gas, or for the production of synthetic gas.

Heavy hydrocarbons such as fuel oils may be cracked in the plant by both thermal and thermal-catalytic processes. In such cases, ceramic pebbles are preferably used as the carrier substance and/or as a catalyst support. The carrier substance enters into a first working space for heating. The liquid hydrocarbons are atomized by means of steam, to be sprayed into a second working space, wherein they are cracked, more or less, depending upon the temperature of the carrier substance. The gaseous cracking products are withdrawn for cooling and subsequent treatment. The solid residues of the cracking process are discharged together with the carrier substance from the second working space, and are preferably recirculated into the first working space where they burn, thus contributing to the heating-up of the carrier substance.

In cases when it is required to modify the boiling margin of liquid hydrocarbons by means of moderate cracking, the hydrocarbons may be pumped as such, i.e. in the liquid state, across the layer of carrier substance, previously heated to a convenient temperature, metallic carrier substances being preferable for this purpose. The oil coke adhering to the carrier substance is burned off in the first working space.

The plant, according to the invention, as described above, may be used for exothermal chemical processes as well, especially when a certain amount of heat has to be withdrawn continuously to keep the reaction temperature at its optimum level.

For a better understanding of the various processes above described, in conjunction with the schematic representations of the respective embodiments, the drying of liquid sewage sludge in combination with refuse incineration will be analyzed in the following, as an illustrative example of the inventive technique.

A refuse incinerating plant as represented in FIG. 9 and equipped with an assembly according to FIG. 10 for the drying of sewage sludge, is presumably built for a town of -for instance—140,000 inhabitants. The assumable daily amount of sludge for this town is about 19 tons of dry substance, corresponding to some 95 m.$^3$ of liquid sludge with 80 percent water contents. For drying this sludge down to water contents of only a few percent, some $2.2 \times 10^6$ kilocalories of heat are necessary, which according to the invention, have to be supplied by the hot carrier substance. The carrier substance consisting of steel balls of 25 mm. diameter is heated in a first working space, incorporated in the refuse incinerator, up to some 450° C. During drying, the carrier substance yields part of its heat contents, leaving the drying space at a temperature of about 150° C., together with some 800 kg./h. of solid, dry sludge. For this some 5.3 tons of carrier substance must be recirculated 10 times per hour. The dried sludge is separated from the carrier substance by sieving and then conveyed into the furnace, there to be incinerated. The water vapor resulting during drying is led into the stream of hot gases issuing from the combustion chamber. A volume of effluent gas of some 23,000 Nm$^3$/h consisting of combustion gases from the burning of refuse and of dry sludge, comingled with the water vapor from the drying process is then led through the upper working space, to flow across the layer of carrier substance therein at a velocity of about 1 m./s. Through this, the temperature of the gaseous mixture is reduced from 750° C. down to about 500° C. With a thickness of 50 mm. for the layer of carrier substance, the drop of pressure-head for the gas stream is of only 2 mm. of water column. The residual heat contents of the effluent gases is recovered by means of the heating surface of the boiler.

In summary, the invention, as described above, is based on the following physical facts and the following reasoning and observations:

The rate of heat transfer to a layer of loose substance is determined by the coefficient of heat transfer, by the specific surface of the substance, and by the volume of the layer. The specific surface is very great with loose substances, being largely dependent upon their granulation. That is why, with layers of a loose substance, large heat transmitting surfaces may be obtained under least volumes, which is a prevailing advantage of this means of heat transfer. Similar conditions also occur in the processes for the transfer of matter.

It should be apparent that in the case of gaseous or liquid agents in counterflow with the carrier substance, the latter must be present in a rather thick layer, to ensure a homogeneous flow through it, which is the assumption for an effective transfer of heat. This thickness may cause a large drop of pressure-head in the stream flowing through the carrier substance which, in most cases, is not acceptable.

In the case of a gaseous or liquid agent in counterflow with a moving mass of loose substance present as a column or layer, the drop of pressure-head is a linear function of the length of path, i.e. the height of the column or the thickness of the layer, and a square function of the velocity of flow. Therefore, and assuming a constant volume of loose substance, the velocity of flow and herewith the drop of pressure-head may be reduced both by increasing the free intervals in the loose substance and by reducing the length of path, i.e. preferring a flat layer to a high column.

In practice, however, it is hardly possible to achieve a homogeneous flow through a thin layer of large extension, this ultimately being the main reason why, in spite of their advantages, heat exchanges of the type with agents in counterflow with a circulated carrier substance, have not been widely used. Both factors: the large drop of pressure-head in the rather high columns required for reasons of efficiency and the impossibility to achieve homogeneous counterflow in flat layers, are apparently the cause of the general misbelief in heat exchangers of this type.

This problem is solved in a simple way with the novel process according to the invention, by causing the receiving and yielding agents to flow through layers of moving carrier substance, crosswise to the direction of movement of the latter. Based on this principle, various embodiments are possible, ensuring sufficiently thin layers of a convenient carrier substance, with sufficient free intervals for the flow of the respective agent through it. Thus, apart from the advantages of efficient heat transfer in a minimum of space, the drop of pressure-head may be reduced to values of no practical importance, whereby new and wide opportunities of application are opened.

Although it is true that for an agent flowing crosswise through a moving layer of loose carrier substances, the outlet temperature may, under some circumstances not be homogeneous, but rather increase in the direction of movement of the carrier substance, this is of little importance in most cases as explained in the description of FIG. 9. In some cases, however, the efficiency of the heat exchange may be reduced, because of the increased outlet temperature of the yielding agent. By dividing the working spaces into two or more sections, connected by means of outside channels, this inconvenience may be overcome. The arrangement as described achieves a combination of cross- and counterflow, by means of which the agent's temperature at its ultimate outlet is not higher as it would be in pure counterflow. This combination may be achieved in a simple manner, without constructional complications and increased costs.

A salient fact is, that by the flow crosswise to the direction of movement of the carrier substance, it becomes possible to provide a plurality of working spaces for the simultaneous performance of different processes therein.

The structure of the permeable sidewalls of the working spaces will be chosen in accordance with the nature of the carrier substance, the operating temperature, and the physical properties of the agents flowing through them. Various materials of metallic, ceramic, and organic nature may be used and the most adequate form of execution may be adopted. Thus, even in the planning stage, optimum operating conditions may be ensured.

For the continuous and homogeneous discharge of the carrier substance from the last working space, mechanisms of contemporary and known types may be used. Depending upon the shape of the outlet and of the operating conditions, cellular locks, cellular rolls, plungers or pusher-type expellers and so forth may be used. For the recirculation proper, i.e. the return of the carrier substance into the first working space, means of known type may be adopted, such as continuous bucket elevators and the like.

The examples of embodiments represented in the drawings are by far not exhaustive of all possibilities. The assembly, according to the invention, may be used with exothermal chemical processes, particularly when a certain amount of heat has to be withdrawn continuously, so as to keep the reaction temperature at its optimum level.

From the above considerations, it should be apparent that the invention is not limited to the embodiments represented and described, but offers wide constructional and functional opportunities for adaptation to the most varied operational requirements as will be appreciated by those skilled in the art.

We claim:

1. A process for the drying of liquid sludge comprising the steps of: providing a solid carrier substance formed of metallic balls; moving the carrier substance downwardly under the effect of gravity through an upper working space; passing combustion gases into the upper working space; heating the carrier substance by means of the combustion gases; passing the heated carrier substance through a lower working space; spraying sewage sludge at the lower working space upon the carrier substance during continuous travel thereof, thereby causing water contained in the sewage sludge to spontaneously vaporize; contacting the water vapor collected at the lower working space with a stream of hot combustion gases for deodorization; discharging the dried sludge from the lower working space together with the carrier substance; separating the dried sludge from the carrier substance; incinerating the separated dried sludge; and recirculating the carrier substance back into the upper working space.

2. A process as defined in claim 1, wherein the dried sludge is separated from the carrier substance by sieving.

3. A process as defined in claim 1 including the step of altering the path of movement of the sewage sludge during its travel through the working space.

4. A process as defined in claim 1, wherein a revolving cylinder is provided as the lower working space, the liquid sewage sludge being sprayed on the hot carrier substance thereat, and wherein crusts of dried sludge adhering to the metallic balls comprising the carrier substance are peeled off during tumbling in the revolving cylinder.

* * * * *